Jan. 29, 1946.  B. J. C. VAN DER HOEVEN  2,393,666
PYRIDINE RECOVERY PROCESS
Filed Dec. 16, 1941
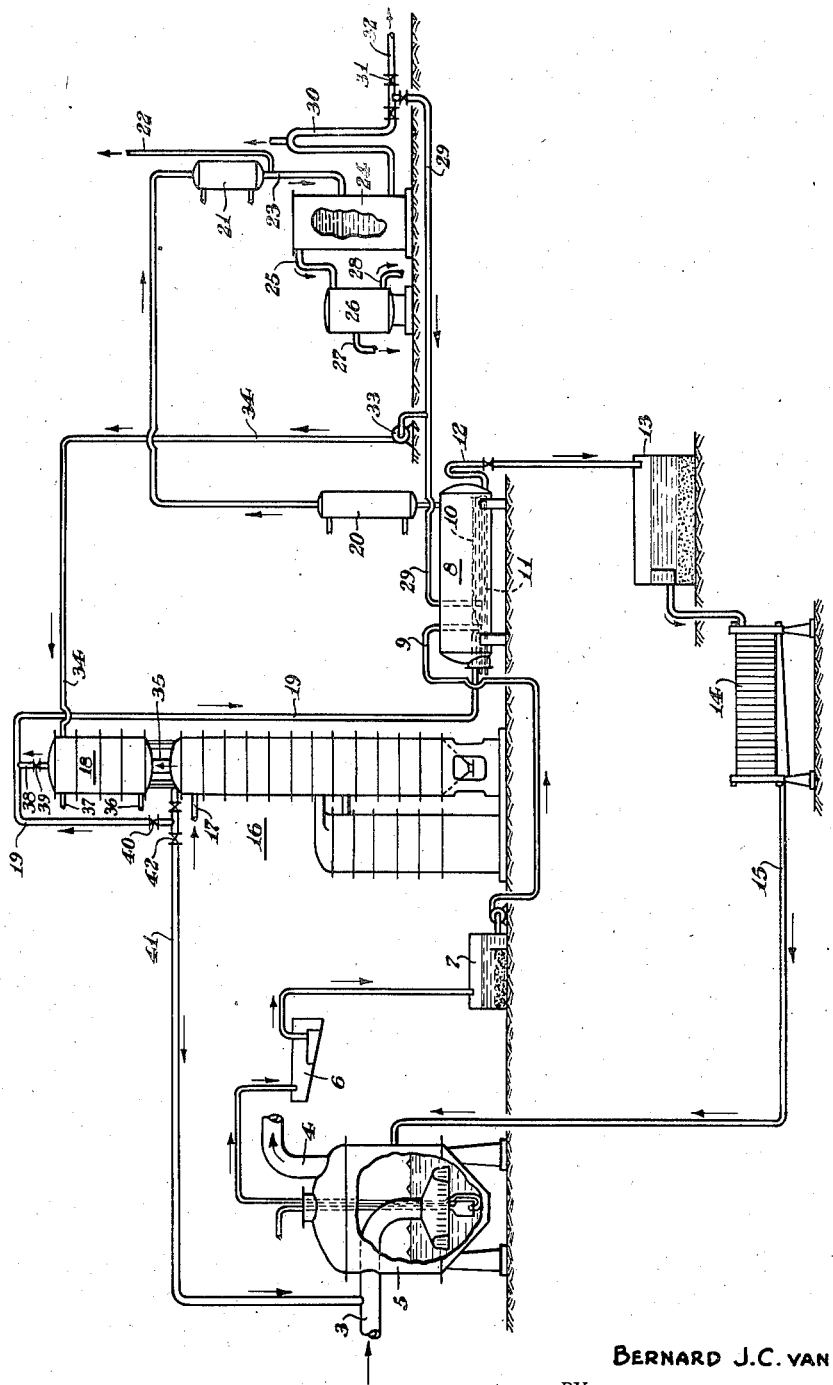
INVENTOR.
BERNARD J.C. VAN DER HOEVEN.
BY Patented Jan. 29, 1946

2,393,666

UNITED STATES PATENT OFFICE 2,393,666

PYRIDINE RECOVERY PROCESS

Bernard J. C. van der Hoeven, Pittsburgh, Pa., assignor, by mesne assignments, to Koppers Company, Inc., a corporation of Delaware Application December 16, 1941, Serial No. 423,195

16 Claims. (Cl. 260—290)

The present invention relates to the recovery of pyridine and related bases from aqueous acidic solutions containing the same and especially from the acid-saturator liquor of a by-product coke plant.

Much of the pyridine and related bases that are evolved during coal carbonization and especially an important portion of pyridine, itself, is present in the gas passing into the acid saturator of the by-product system. These bases accumulate in the acid-saturator liquor until their vapor pressure in the liquid is in equilibrium with that of their content in the inlet gas, whereupon they are no longer absorbed, but are expelled with the effluent gas.

The recovery method described and claimed in copending application of John W. Schutt, Serial No. 308,237 filed December 8, 1939 (now Patent No. 2,311,134, issued Feb. 16, 1943), accomplishes the removal of pyridine bases from the acid saturator-liquor by neutralization and distillation of withdrawn increments thereof, by means of an excess of ammonia-still vapors containing carbon dioxide, these steps being followed by dephlegmation of the distilled vapors to reduce their water content, and thereafter by a condensation of the vapors residual to such dephlegmation, the said employed excess of ammonia-still vapors having ammonia and carbon dioxide contents adequate to form, with the aqueous fraction of said condensate, a sufficiently strong solution of a carbonate salt of ammonia to salt out therefrom and gravitally segregate pyridine content thereof as a decantable upper layer.

The Schutt process gives very satisfactory results where the concentration of carbon dioxide and its ratio to ammonia in the ammonia-still gases are sufficiently high to provide in the step of separating pyridine, from the aqueous condensate, an aqueous carbonate-of-ammonia solution of such concentration as will maintain in substantial segregation, from the aqueous portion, the pyridine and related bases. The ratio of carbon dioxide to ammonia in gases effluent to coke-plant ammonia-liquor stills, however, varies widely between coke-oven plants and, many times, is very low, especially when the ammonia-still gases include that ammonia of the fixed ammonia content of ammonia-liquor liberated in the lime-leg of an ammonia still. When this latter condition obtains, amongst others, there may be in the ammonia-still vapors inlet to the pyridine-still less carbon dioxide present than is required to form, with that ammonia which is in excess of the ammonia content of said vapors employed for neutralization of the saturator liquor, a carbonate salt in sufficent quantity to effect satisfactory separation of pyridine from the condensed steam required to volatilize the pyridine from the pyridine-still, and the subsequent gravital separation of the pyridine and the carbonate-of-ammonia solution is rendered less satisfactory and may be very difficult by reason of free ammonia dissolved in the aqueous solution, whereby its density can be lowered to such an extent that it will no longer float the pyridine.

This presence of dissolved free ammonia can be itself avoided by the simple expedients of flowing ammonia-still vapors to the neutralization and distillation step in a quantity such that there remains, residual to the neutralization of the saturator liquor, only enough ammonia to be stoichiometrically equivalent to the relatively low concentration of carbon dioxide introduced therewith and, of supplying, if necessary, such additional heat for the pyridine distillation in the form of direct or indirect steam instead of relying on additional ammonia-still vapors for distillation heat. Such procedure, however, may not provide carbon dioxide or ammonia in quantities that are adequate to form a sufficiently strong solution of their salts to separate pyridine from the subsequently condensed steam that is required to carry the pyridine content of the neutralized saturator-liquor into its condensation step.

It is an object of the present invention to provide improvements in the process as hereinabove described whereby the pyridine bases can be readily and economically recovered when employing, in its practice, ammonia-still gases that show a deficiency in carbon dioxide for the purpose.

A further object of invention is provision of simple means whereby that quantity of carbon dioxide available to or present within the system of said process at any given operating interval can be utilized to overcome the difficulty presented by its insufficient concentration in the vapors and gases normally effluent to the ammonia still of the associated coke plant.

The invention has for further objects such other improvements and such other operative advantages or results as may be found to obtain in the processes or apparatus hereinafter described or claimed.

By means of the instant improvement, ammonia-still gases and vapors, wherein the carbon dioxide is so low that their direct employment in the pyridine-recovery process as delineated in the above-mentioned copending application (now Patent No. 2,311,134) precludes satisfactory separation of pyridine and related bases from the aqueous fraction of the distilled pyridine condensate, can still serve as the source for the ammonia and the carbon dioxide that are continuously flowed into and, in part, entirely through the pyridine-recovery system.

The present invention provides for inflows of ammonia and carbon dioxide into the pyridine-distillation zone at preadjusted rates that are correlated to the simultaneous inflow of pyridine-bearing acidic liquor, the rate of inflow of carbon dioxide being sufficient that its absorption and conversion to carbonate of ammonia in the condensed steam, that is required to remove pyridine-base from said pyridine-distillation zone and to carry it into the condensation step, is adequate effectively to separate pyridine from said condensed steam, and the rate of inflow of ammonia being such as will both liberate pyridine from acidic saturator-liquor at its rate of entry into the distillation zone and also form a carbonate salt with carbon dioxide at its said rate of inflow. The carbon dioxide and ammonia may be flowed into the pyridine-distillation zone either separately or in admixture. In some instances, ammonia-still vapors may contain only a slight deficiency of carbon dioxide and the present requirements can be met by simple removal of some of their ammonia by, for example, passing the vapors through dissociator apparatus adapted to reject ammonia and water contained therewith, and thereafter flowing the vapors, so-adjusted in respect of their ratio of carbon dioxide to ammonia, directly, and without further enrichment in respect of the former, to the pyridine-distillation zone. The invention also provides for the maintaining of the required proportionate relationship between carbon dioxide and ammonia in those instances where there is such deficiency of carbon dioxide of the ammonia-still vapors that even those vapors flowed through dissociator apparatus are unsuited for the present purpose, by reusing the active components of that carbonate of ammonia previously collected in the condensation step of the process. Such reusing of ammonia and carbon dioxide can be accomplished by recycling carbonate-of-ammonia solution from the condensation step to the pyridine-distillation zone either directly, or by previously volatilizing its active components in, for example, the ammonia still and retaining the carbon dioxide thereof in the system by means of said dissociator apparatus, or by extraneously revolatilizing its active components in an auxiliary still and delivering them to the said distillation zone. It is obvious that by said recycling of carbon dioxide and ammonia that the only additional ammonia requirement in the practice of the process is for the liberation of pyridine bases from the inflowing acid saturator liquor which can, of course, have its source in ammonia-still vapors of any composition. Continuous recycling of the active components of carbonate of ammonia from the condensation step to the pyridine-distillation zone makes it a simple matter, by such entrapment of, especially, carbon dioxide within the process system, to maintain any preferred degree of concentration of these said components in the aqueous condensate.

The accompanying drawing forming a part of this specification and showing for purposes of exemplification a preferred apparatus and method in which the invention may be embodied and practiced but without limiting the claimed invention specifically to such illustrative instance or instances, is a diagrammatic elevational view of apparatus for the continuous recovery of pyridine bases in accordance with the present invention.

Ammonia- and pyridine-bearing coke-oven gas is flowed through gas inlet 3 into ammonia saturator 5 and is scrubbed by an acid-actuator bath therein. The gas substantially free of said ammonia and pyridine leaves the saturator through gas outlet 4. Saturator bath liquor is withdrawn therefrom either continuously or intermittently and at a rate to prevent loss to the salt or to the effluent gas, of pyridine and related bases. The so-withdrawn liquor after having been freed of its solid ammonium sulphate by means of salt table 6 and settling tank 7 is thereafter delivered to pyridine-neutralizing still 8 through pipe 9. Herein the free pyridine bases are liberated by neutralization of said liquor by the introduction of ammonia-still vapors emitting from perforated distributor pipe 10 and are distilled therefrom by the heat of said neutralization that, optionally, can be augmented by the heat of indirect steam supplied to steam coil 11. Depyridinized liquor is withdrawn from pyridine still 8 through seal 12 and is delivered to settling tank 13 and filtering means 14 for the removal of solids present in the said liquor and especially of sulphides formed by reaction of saturator-liquor contaminants with hydrogen sulphide, also present in the ammonia-still gas. The so-clarified liquor is thereafter returned to the ammonia saturator through pipe 15.

Ammonia-liquor still 16 that is provided with ammonia liquor inlet 17 and dissociator 18 produces the ammonia-still gases that are supplied through pyridine still feed line 19 and the hereinabove mentioned perforated distributor-pipe 10 in pyridine still 8 for the neutralization of the said saturator liquor and for the distillation of pyridine therefrom. Vaporized pyridine, the ammonia residual to neutralization, the carbon dioxide, and the steam of the ammonia-still vapors are dephlegmated in partial-condenser apparatus 20 therefor in a manner as described in the above-mentioned copending application and for the purpose of increasing the concentration of ammonium carbonate in the subsequent condensate. The dephlegmated vapors are condensed in condenser 21 and any fixed gases present therein are allowed to escape through vent 22. The condensate comprising pyridine and ammonium carbonate solution flows through pipe 23 into a separator 24, for separation into two liquid phases, a lighter supernatant pyridine layer and a denser, concentrated ammonium carbonate solution. The so-separated partially dehydrated pyridine is decanted through pipe 25 to pyridine storage tank 26, that is equipped with an elevated outlet 27 and with a drain line 28 for removing further quantities of water by separation. While this separation can be, as hereinbefore discussed, readily accomplished by the method of the Schutt invention when the carbon dioxide to ammonia ratio of the ammonia-still gases is of the correct value, separation of pyridine is extremely difficult and often practically infeasible when a great excess of ammonia occurs therein, and the carbon dioxide content is low.

The present invention solves this difficulty in simple and novel manner by entrapping carbon dioxide, originally delivered in insufficient relative quantity to the pyridine still, within a cycle comprising the distillation, the condensation, and the gravital separation steps of the described process, said entrapment being accomplished either directly by returning ammonium carbonate solution through line 29 from said separator 24 and seal 30 to said pyridine still 8 or indirectly by such hereinafter described means as returning said solution to ammonia-liquor still 16 and therein revaporizing the same and admixing so-produced ammonia and carbon dioxide with the aforementioned ammonia-still gases that are thereafter flowed to the said pyridine-neutralizing still, thereby to provide in the vapors effluent to the pyridine still carbon dioxide in concentration substantially stoichiometrically equivalent to residual ammonia also present in said vapors. Ammonium carbonate solution, so-returned to the pyridine still, furnishes the distillation step with a source of ammonia and carbon dioxide of which the former has been diminished in relative quantity by the aforementioned neutralization of acid saturator-bath liquor. It can be seen therefore, that, while the ammonium carbonate solution initially recycled to the pyridine still can contain dissolved ammonia, it is soon reduced and eventually eliminated by repeated neutralization of the acid liquor. Thereafter, the flow of ammonia-still vapors to the pyridine still needs to be maintained only at that rate supplying sufficient ammonia to neutralize the acid bath and to react with that relatively small amount of carbon dioxide carried along therewith. Introduction of this flow of still vapors to the pyridine still will, of course, continue to produce additional ammonium carbonate at a rate stoichiometrically equivalent to the rate of carbon dioxide additions thereto. Such accumulated ammonium carbonate solution can be returned to the ammonia-liquor still or can be delivered to any preferred apparatus, by the opening of valve 31 in drain line 32.

It is to be noted in operation of the present improvement that, even though the inflow of ammonia-still vapors may be decreased to substantially merely that rate providing neutralization of the simultaneous inflow of saturator-bath liquor and liberation of the pyridine bases contained therein, nevertheless an equal volume of acid saturator-bath liquor is neutralized at the same rate as when a great excess of ammonia-still vapors is employed, and thus the same total heat of neutralization is obtained. If, however, it is desired to avoid the use of indirect steam supplied to the said steam coil 11, when such is needed in order to revaporize the returned ammonium carbonate solution, the solution can be returned instead by pump 33 from pipe 29 and through line 34 to the aforementioned dissociator 18, wherein the solution can be revaporized and returned to the neutralizing still 8 through pipe 19, or the solution can be vaporized in extraneous apparatus and even dephlegmated extraneously in order partially to dehydrate the vaporized ammonium carbonate constituents before their return to the vapors effluent to the pyridine still.

In starting up operation of the process, a certain time of recycling will be required until sufficient ammonia and carbon dioxide have been collected in solution to produce a good separation. In those special circumstances where the carbon dioxide content is extremely low, this starting up period may be excessively long, for, although the pyridine bases can be distilled from the saturator liquor, they may be, for a wastefully long time, unobtainable in that readily decantable form that is ordinarily provided by their gravital segregation from an aqueous carbonate-of-ammonia solution of requisite concentration and density.

Provision is therefore made, in the present invention, of a method for directly preadjusting the proportionate inflows of ammonia and carbon dioxide to the pyridine still, said method being, in addition to its important general utility, of special application for initiation of the process-operation in such as the hereinabove described case where the ammonia-still gases are extremely deficient in carbon dioxide, and where the hereinabove described improvement of recycling carbonate-of-ammonia solution is cooperatively employed. Such preadjustment of the ratio of carbon dioxide to ammonia in the ammonia-still vapors is accomplished by a partial condensation of the latter in a dissociator 18, of conventional design, that is disposed atop the ammonia still 16 and is connected therewith by pipe 35. The dissociator is supplied with indirect cooling means, the cooling water being received and discharged through pipes 36 and 37 respectively. By means of the said dissociator ammonia and water, that are present in ammonia-still vapors immediately effluent to the ammonia still, can be refluxed to the still column, and an ammonia-still gas with an increased carbon dioxide to ammonia ratio can thus be flowed directly to the pyridine still 8 through vapor line 38 and the still feed line 19 to which line the former connects. So-treated ammonia-still vapors that are effluent to the dissociator and that have a higher ratio of carbon dioxide to ammonia than that of the original ammonia-still vapors can also be blended with a stream of the latter flowing directly from the ammonia still by adjustment of valve 39 in vapor line 38 and of valve 40 in still feed line 19. Those ammonia-still vapors not employed in operation of the pyridine-neutralizing still are delivered to the gas inlet of the saturator 5 through ammonia-still vapor line 41 at a rate that is governed by adjustment of valve 42 disposed therein.

Where the required increase in the ratio of carbon dioxide to ammonia in the ammonia-still vapors is not great, the dissociator 18 can be employed alone to provide the proper proportionate inflows of ammonia and carbon dioxide to the pyridine still. In such operation, subsequently condensed ammonium carbonate solution need not, of course, be returned to the pyridine-distillation zone.

In that optional method for the recirculation of ammonium carbonate solution which comprises flowing it as hereinbefore described through means including pipe 34 to the said dissociator 18, the solution can be itself employed as a direct cooling means in the dissociator and in turn, can be evaporated therein. By such optional operation, ammonium carbonate solution is, as aforementioned, vaporized before delivery to the pyridine still and thereby possible dilution of the pyridine bases in the still contents is avoided. In many cases, however, the ammonium carbonate solution from the separator will contain a high enough concentration of pyridine bases that very little, if any, dilution will occur even though direct recycling of ammonium carbonate solution is employed. In addition, the described delivery of ammonium carbonate solution in vaporized form serves, along with the heat of neutralization of the saturator liquor, to provide the heat for distillation thereby avoiding possible need for the auxiliary use of indirect steam.

In the absence of a dissociator it is in many instances possible to conserve much of the carbon dioxide component of the ammonium carbonate solution by returning the separated aqueous solution directly to the ammonia still. Such operation would be applicable only when most of the ammonia-still vapors is delivered to the neutralizing still and when the required increase in the carbon dioxide to ammonia rate is not great.

The invention as hereinabove set forth is embodied in particular form and manner but may be variously embodied within the scope of the claims hereinafter made.

I claim:

1. In a process for recovering pyridine bases from saturator-bath liquor of ammonium sulphate containing the same, which comprises, flowing said saturator-bath liquor and ammonia-still vapors into a pyridine distillation zone, distilling from such mixture pyridine base and aqueous vapors along with some ammonia and carbon dioxide, and condensing these said distilled constituents in the presence of each other to form an aqueous solution of a carbonate salt of ammonia that will gravitatively separate the pyridine bases therefrom as a supernatant layer of pyridine-base concentrate, the improvement comprising, recycling carbonate salt of ammonia previously collected in said condensation step into said pyridine distillation zone by distilling, separately from the ammonia-liquor from which the ammonia still vapors are derived, aqueous solution of said salt that is withdrawn from said condensation step and flowing the resultant ammonia and carbon dioxide vapors into said pyridine distillation zone, thereby to ensure in said condensation step the presence of sufficient of said salt to maintain the density of the condensate at a value sufficiently high to effect the aforesaid gravitational separation of a supernatant layer of pyridine base adequately and easily in those instances where the said ammonia-still vapors would otherwise contain a deficiency of carbon dioxide for that purpose.

2. In a process for recovering pyridine bases from saturator-bath liquor of ammonium sulphate containing the same, which comprises, flowing said saturator-bath liquor and ammonia-still vapors into a pyridine distillation zone, distilling from such mixture pyridine base and aqueous vapors along with some ammonia and carbon dioxide, and condensing these said distilled constituents in the presence of each other to form an aqueous solution of a carbonate salt of ammonia that will gravitately separate the pyridine bases therefrom as a supernatant layer of pyridine-base concentrate, the improvement comprising, recycling carbonate salt of ammonia previously collected in said condensation step by distilling aqueous solution thereof withdrawn from said condensation step into the aforementioned ammonia-still vapors, thereafter flowing resultant vaporous mixture into a dissociation step and dissociating from the vaporous mixture and retaining therein a portion of their ammonia content while passing substantially all the carbon dioxide content and therein increasing the ratio of carbon dioxide to ammonia in ammonia-still vapors, before the latter enters said pyridine distillation zone to a ratio which will maintain the density of the aqueous portion from the condensing step at a value sufficiently high to effect the aforesaid gravitational separation of pyridine bases adequately and easily.

3. In a process for recovering pyridine bases, from saturator-bath liquor of ammonium sulphate containing the same, which process comprises, flowing said saturator-bath liquor and ammonia-still vapors into a pyridine distillation zone, distilling from such mixture both pyridine base and aqueous vapors, thereafter condensing them in the presence of each other, said ammonia-still vapors normally containing a ratio of carbon dioxide to ammonia less than can supply to the said pyridine base and aqueous vapors at their rates of distillation sufficient carbonate salt of ammonia to effect by solution in the aqueous portion of said distillation vapors upon their condensation a substantial gravitational segregation of pyridine base from said aqueous portion, the improvement comprising, decreasing the ratio of ammonia to carbon dioxide in said ammonia-still vapors, during their flow from their ammonia-still to said pyridine distillation zone, relative to that which existed in the vapors as they issued from the liquor in their still, to such proportionate relationship that the resultant vapors contain, when they flow into said pyridine distillation zone, substantially merely sufficient ammonia both to liberate pyridine base from the inflowing saturator-bath liquor and to form with the carbon dioxide content of the vapors such a quantity of a carbonate salt of ammonia that after said distillation and said condensation the density of said aqueous portion will be of a value sufficiently high to automatically separate the pyridine bases from said aqueous portion as a supernatant layer of pyridine-base concentrate adequately and easily by gravitational separation.

4. In a process for recovering pyridine bases from saturator-bath liquor of ammonium sulphate containing the same, which comprises flowing such saturator-bath liquor and also ammonia-still vapors into a pyridine distillation zone, distilling from the resultant mixture both pyridine base and aqueous vapors, thereafter condensing them in the presence of each other, said ammonia-still vapors normally containing a ratio of carbon dioxide to ammonia less than can supply to the said pyridine base and aqueous vapors at their rate of distillation sufficient carbonate salt of ammonia to effect, by its solution in the aqueous portion of said pyridine distillation vapors, upon their condensation, a substantial segregation of pyridine base from said aqueous portion by gravitational separation, the improvement comprising, decreasing the ratio of ammonia to carbon dioxide in said ammonia-still vapors by flowing them into dissociator apparatus that is operative to retain a portion of their ammonia content and to permit passage of substantially all their carbon dioxide content, and in said dissociator apparatus dissociating from the vapors and retaining therein the portion of the ammonia content of said vapors in excess of that required for establishing in the ammonia-still vapors effluent to said dissociation apparatus such proportionate relationship of the carbon dioxide to ammonia in the contents of the effluent vapors prior to their flow into said pyridine distillation zone, that said effluent vapors from the dissociating step contain substantially merely sufficient ammonia both to liberate pyridine base from the saturator-bath liquor in the pyridine distillation zone and to form with the carbon dioxide content of the effluent vapors a carbonate salt of ammonia in amount such that during the subsequent condensation the latter dissolves in the aqueous portion of the condensate in an amount sufficient to maintain the density of said aqueous portion at a value sufficiently high to automatically separate the pyridine base from said aqueous portion as a supernatant layer of pyridine-base concentrate by gravitational separation adequately and easily.

5. In a process for recovering pyridine bases from saturator-bath liquor of ammonium sulphate containing the same, which comprises, flowing said saturator-bath liquor and ammonia-still vapors into a pyridine distillation zone, distilling from such mixture pyridine base and aqueous vapors along with some ammonia and carbon dioxide, and condensing these said distilled constituents in the presence of each other to form an aqueous solution of a carbonate salt of ammonia that will gravitatively separate the pyridine bases therefrom as a supernatant layer of pyridine-base concentrate, the improvement comprising, flowing the vapors from the ammonia still that are to be passed into said pyridine distillation zone through a dissociator apparatus and dissociating from the vapors and retaining therein a portion of their ammonia content while passing substantially all of their carbon dioxide content, and thereby increasing the ratio of carbon dioxide to ammonia in the ammonia-still vapors prior to their introduction into said distillation zone, and recycling carbonate salt of ammonia previously collected in said condensation step to a prior distillation step in the process so that its components are volatilized into the process in such manner that the ammonia and carbon dioxide thereof mixes with only those vapors from the ammonia still that are to be passed into said pyridine distillation zone, and issue from said pyridine distillation zone, in admixture with new quantities of pyridine base from the saturator-bath liquor and aqueous vapor from the dissociator in amounts such that, together, the dissociating step and the recycling step ensure in said condensation step the presence of sufficient carbonate salt of ammonia in solution in the aqueous condensate to maintain its density at a value sufficiently high to effect the aforesaid gravitational separation of a supernatant layer of pyridine base adequately and easily in those instances where the vapors from the ammonia-still, after passing through, without use of the dissociating and recycling steps, would otherwise contain a deficiency of carbon dioxide for the purpose.

6. A method as claimed in claim 2, and in which the carbonate salt of ammonia is recycled into the ammonia-still.

7. A method as claimed in claim 5, and in which the carbonate salt of ammonia is recycled into the dissociator step.

8. A method as claimed in claim 5, and in which the carbonate salt of ammonia is recycled into the said distilling zone.

9. In a process for recovering pyridine base from saturator-bath liquor of ammonium sulphate, which process comprises: flowing saturator-bath liquor and ammonia-still vapors into a distillation zone, distilling from such mixture pyridine base and aqueous vapor along with ammonia and carbon dioxide, and condensing said distilled constituents in the presence of each other to form an aqueous solution of a carbonate salt of ammonia that will gravitatively separate the pyridine base therefrom as a supernatant layer of pyridine base concentrate, the improvement comprising; flowing the vapors from the ammonia still, that are to be passed into said distillation zone, into dissociation step and dissociating from said vapors and retaining therein a portion of their ammonia content while passing substantially all of their carbon dioxide content, thereby increasing the ratio of carbon dioxide to ammonia in the ammonia-still vapors prior to their introduction into said distillation zone, to ensure an absence of an excess of ammonia over that for neutralization in the distillation zone and for forming a solution of carbonate salt of ammonia in sufficient quantity in the aqueous condensate to maintain its density at a value sufficiently high to effect the aforesaid gravital separation of the pyridine bases as a supernatant layer of pyridine base concentrate adequately and easily.

10. In a process for recovering pyridine bases from saturator-bath liquor of ammonium sulphate, which process comprises: flowing saturator-bath liquor and ammonia-still vapors into a pyridine distillation zone, distilling from such mixture pyridine base and aqueous vapor along with ammonia and carbon dioxide, and condensing said distilled constituents in the presence of each other to form an aqueous solution of a carbonate salt of ammonia that will gravitatively separate the pyridine bases therefrom as a supernatant layer of pyridine base concentrate, the improvement comprising; flowing a portion only of the vapors from an ammonia still into the pyridine distilling zone, and recycling carbonate salt of ammonia previously collected in said condensation step so that its components are volatilized into the process in such manner that the carbon dioxide thereof mixes with only those vapors from the ammonia-still that are to be passed into said pyridine distillation zone, and issue from said pyridine distilling zone in admixture with new quantities of pyridine base from the saturation-bath liquor and the aqueous vapor from the ammonia still in amount such that, together, the vapor flow from the still and the recycling step ensure that in the condensation step enough of the ammonia present therein is combined in the form of a solution of a carbonate salt of ammonia in the aqueous condensate to maintain the density of the aqueous condensate at a value sufficiently high to effect the aforesaid gravitational separation of the pyridine bases as a supernatant layer of pyridine base concentrate adequately and easily.

11. In a process of recovering pyridine base from coke-plant ammonium-sulphate saturator liquor containing the same, said process comprising: flowing saturator liquor aforesaid and part of the wet ammonia-still vapors of said coke plant together into a pyridine-base distillation zone, with passage of some of said wet ammonia-still vapors and the distilled pyridine-base vapors therefrom, followed by their condensation in the presence of each other, the improvement comprising; for such coke-plant ammonia-still vapors as natively contain such high ratio of ammonia to carbon dioxide, when flowed directly from the coke plant ammonia still directly into the pyridine-base distillation zone, that ammonium carbonate fails of formation in the aforesaid condensation step in sufficient quantity to effect adequate and easy gravitational separation of the condensed pyridine base from the aqueous portion of the condensate, preadjusting the carbon dioxide concentration in the stream of those ammonia-still vapors that are to be flowed into the pyridine distillation zone relative to that which existed in the vapors as they issued from the liquor in the ammonia still, after separation of said vapors from the remaining part of the still vapors but prior to their admixture with said saturator liquor, until their carbon dioxide content is sufficiently high that after their neutralization of the saturator liquor, and liberation of pyridine from the latter, the remaining said wet vapors passing to the said condensation step along with pyridine-base vapor distilled from said liquor have a carbon dioxide-to-ammonia ratio that is at least substantially about said ratio in ammonium carbonate, and simultaneously condensing said remaining wet still vapors and pyridine vapors in the presence of each other thereby forming aqueous solution of ammonium carbonate in the condensation step and inhibiting the otherwise dissolution of so-condensed pyridine base in the aqueous portion of said condensate.

12. A process as claimed in claim 11 and in which those ammonia-still vapors that are flowed into admixture with the saturator liquor are preadjusted in respect of their carbon dioxide concentration as aforesaid by flowing said vapors through a cooling zone after their withdrawal from the ammonia-still and prior to their admixture with the saturator liquor, and maintaining said cooling zone at a temperature sufficiently low selectively to remove ammonia from said vapors by dissociation therefrom but sufficiently high to enrich the carbon dioxide concentration in the vapor effluent to said cooling zone.

13. A process as claimed in claim 11 and in which those ammonia-still vapors that are flowed into admixture with the saturator liquor are preadjusted in respect of their carbon dioxide concentration as aforesaid by blending therewith, after their separation from the remaining part of the still vapors from the still but prior to their introduction into the pyridine-base distillation zone, ammonia and carbon dioxide derived from ammonium carbonate previously condensed in the said condensation step.

14. In a process for recovering pyridine base from coke-plant ammonium-sulphate saturator-liquor containing the same, said process comprising flowing saturator liquor aforesaid and part of the wet ammonia-still vapors of said coke plant together into a pyridine-distillation zone, with passage of some of said wet ammonia-still vapors and the distilled pyridine base from said zone followed by their condensation and separation in the presence of each other, the improvement comprising, for such part of the coke-plant ammonia-still vapors as upon delivery directly from the coke-plant ammonia-still directly into the pyridine-base distillation zone fail, regardless of their concentration of ammonia even upon extensive dephlegmation of those said ammonia-still vapors that pass with the pyridine from its distillation zone, gravitatively to separate condensed pyridine from aqueous condensate, increasing the carbon dioxide content of the part of the ammonia-still vapors flowing through said pyridine-recovery process system relative to that which existed in the vapors as they issued from the liquor in the ammonia still, between their point of entry into and their condensation in the presence of distilled pyridine in the pyridine recovery system, by a step providing carbon dioxide in at least about substantially stoichiometric ratio to the ammonia thereof entering said condensation step and thereby causing pyridine to separate in a phase separate from the aqueous fraction of condensed condensate.

15. A process as claimed in claim 14 and wherein the carbon dioxide employed for establishing the said stoichiometric ratio between carbon dioxide and ammonia is derived by re-vaporizing into said process system ammonium carbonate recovered from the step of pyridine condensation and separation.

16. A process as claimed in claim 1, and in which the carbonate of ammonia solution from the condensation step is recycled directly into said pyridine distillation zone and distilled therein.

BERNARD J. C. van der HOEVEN.